(12) United States Patent
Zhou

(10) Patent No.: US 12,371,201 B2
(45) Date of Patent: Jul. 29, 2025

(54) MULTI-ROTOR AIRCRAFT

(71) Applicant: Pengyue Zhou, Guangdong (CN)

(72) Inventor: Pengyue Zhou, Guangdong (CN)

( * ) Notice: Subject to any disclaimer, the term of this patent is extended or adjusted under 35 U.S.C. 154(b) by 43 days.

(21) Appl. No.: 17/849,847

(22) Filed: Jun. 27, 2022

(65) Prior Publication Data

US 2022/0324569 A1    Oct. 13, 2022

Related U.S. Application Data

(63) Continuation of application No. PCT/CN2020/000327, filed on Dec. 28, 2020.

(30) Foreign Application Priority Data

Dec. 27, 2019 (CN) .......................... 201922427413.9

(51) Int. Cl.
| | | |
|---|---|---|
| *B64C 13/28* | (2006.01) | |
| *B64D 5/00* | (2006.01) | |
| *B64D 31/00* | (2006.01) | |
| *B64U 10/16* | (2023.01) | |
| *B64U 20/30* | (2023.01) | |
| *B64U 20/50* | (2023.01) | |
| *B64U 30/297* | (2023.01) | |
| *B64U 60/50* | (2023.01) | |
| *B64U 70/30* | (2023.01) | |
| *B64U 101/16* | (2023.01) | |

(Continued)

(52) U.S. Cl.
CPC ................. *B64C 13/28* (2013.01); *B64D 5/00* (2013.01); *B64D 31/00* (2013.01); *B64U 10/16* (2023.01); *B64U 20/30* (2023.01); *B64U 20/50* (2023.01); *B64U 30/297* (2023.01); *B64U 60/50* (2023.01); *B64U 70/30* (2023.01); *B64U 2101/16* (2023.01); *B64U 2101/24* (2023.01); *B64U 2101/26* (2023.01)

(58) Field of Classification Search
CPC .... B64U 2101/00; B64U 10/13; B64U 20/40; B64U 20/50; B64U 20/70; B64U 40/00; B64U 40/20; B64U 2101/16
See application file for complete search history.

(56) References Cited

U.S. PATENT DOCUMENTS

2021/0214075 A1 *  7/2021  Yamato .................. B64C 27/08

FOREIGN PATENT DOCUMENTS

| CN | 206358359 U | 7/2017 |
|---|---|---|
| CN | 109221060 A | 1/2019 |

(Continued)

*Primary Examiner* — Richard G Davis

(57) ABSTRACT

A multi-rotor aircraft comprising a controller, an annular airframe, at least two first rotor units and at least two actuation components. Wherein, the annular airframe comprises at least two frames and at least two connecting units, adjacent frames are movably connected by at least one of the connecting units; the first rotor units are arranged on the annular airframe and are electrically connected with the controller, the first rotor units are used to provide lift for the multi-rotor aircraft to fly; the actuation components are arranged on the annular airframe and are electrically connected with the controller; when the multi-rotor aircraft flies, the actuation components are used for driving the adjacent frames to move away from each other or to move close to each other, so as to enlarge or reduce the enclosed area of the annular airframe respectively.

20 Claims, 13 Drawing Sheets

(51) Int. Cl.
   *B64U 101/24*   (2023.01)
   *B64U 101/26*   (2023.01)

(56) References Cited

FOREIGN PATENT DOCUMENTS

JP      6569106   B1   9/2019
WO   2019116323   A1   6/2019

* cited by examiner

MULTI-ROTOR AIRCRAFT

CROSS REFERENCE TO RELATED APPLICATIONS

The present disclosure is a continuation application of the international application No. PCT/CN2020/000327 filed on Dec. 28, 2020, which claims priority from the Chinese patent application No. 201922427413.9, entitled "multi-rotor aircraft", filed on Dec. 27, 2019, the entire content of which are hereby incorporated by reference.

TECHNICAL FIELD

The present disclosure belongs to the technical field of aircraft, and particularly relates to multi-rotor aircraft.

BACKGROUND

At present, a large multi-rotor aircraft is increasingly for civil use, however, the large multi-rotor aircraft needs a large-area site in the process of taking-off and landing, which makes the application scope of the large multi-rotor aircraft limited.

If an automatic storage apparatus is used for accommodating the large multi-rotor aircraft, that is, the automatic storage apparatus is used for the large multi-rotor aircraft to take off and to lands on, and is also used for automatically storing and charging the large multi-rotor aircraft, accordingly, the automatic storage apparatus also needs to be a large one, thus significantly increasing the cost of designing and manufacturing the automatic storage apparatus, and also increasing the difficulty of transporting and installing the automatic storage apparatus.

SUMMARY

As such, the present disclosure proposes a multi-rotor aircraft, the multi-rotor aircraft comprises a controller, an annular airframe, at least two first rotor units and at least two actuation components. Wherein, the annular airframe comprises at least two frames and at least two connecting units, adjacent frames are movably connected by at least one of the connecting units; the first rotor units are arranged on the annular airframe and are electrically connected with the controller, the first rotor units are used to provide lift for the multi-rotor aircraft to fly; the actuation components are arranged on the annular airframe and are electrically connected with the controller; when the multi-rotor aircraft flies, the actuation components are used for driving the adjacent frames to move away from each other or to move close to each other, so as to enlarge or reduce the enclosed area of the annular airframe respectively.

Details of one or more embodiments of the invention are provided in the following drawings and description. Other features, objects and advantages of the invention will become obvious from the description, the drawings and the claims.

BRIEF DESCRIPTION OF DRAWINGS

To better explain the embodiments of the present disclosure or the technical solutions of the prior art, the following will briefly introduce the drawings involved in the description of the embodiments or the prior art. It is obvious that the drawings in the following description are only some embodiments of the invention. For persons skilled in the art, the drawings of other embodiments can be obtained from these drawings without paying creative work.

DETAILED DESCRIPTION OF THE EMBODIMENTS

In order to help understanding of the present disclosure, the present disclosure will be described more comprehensively hereinafter with reference to the relevant accompanying drawings.

Embodiment 1

Figure 1:
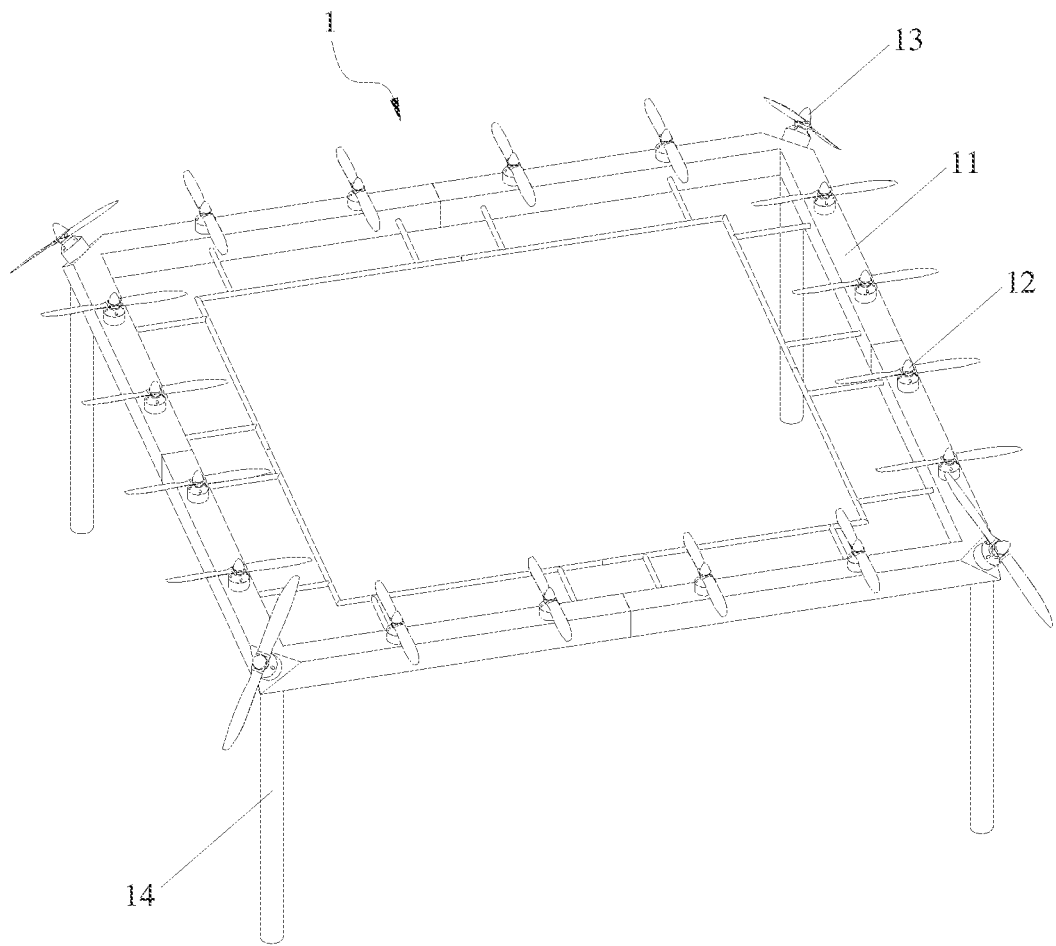
FIG. 1 is a schematic diagram of a multi-rotor aircraft in a shrinked state according to Embodiment 1, 2 and 5 of the present disclosure.
Figure 2:
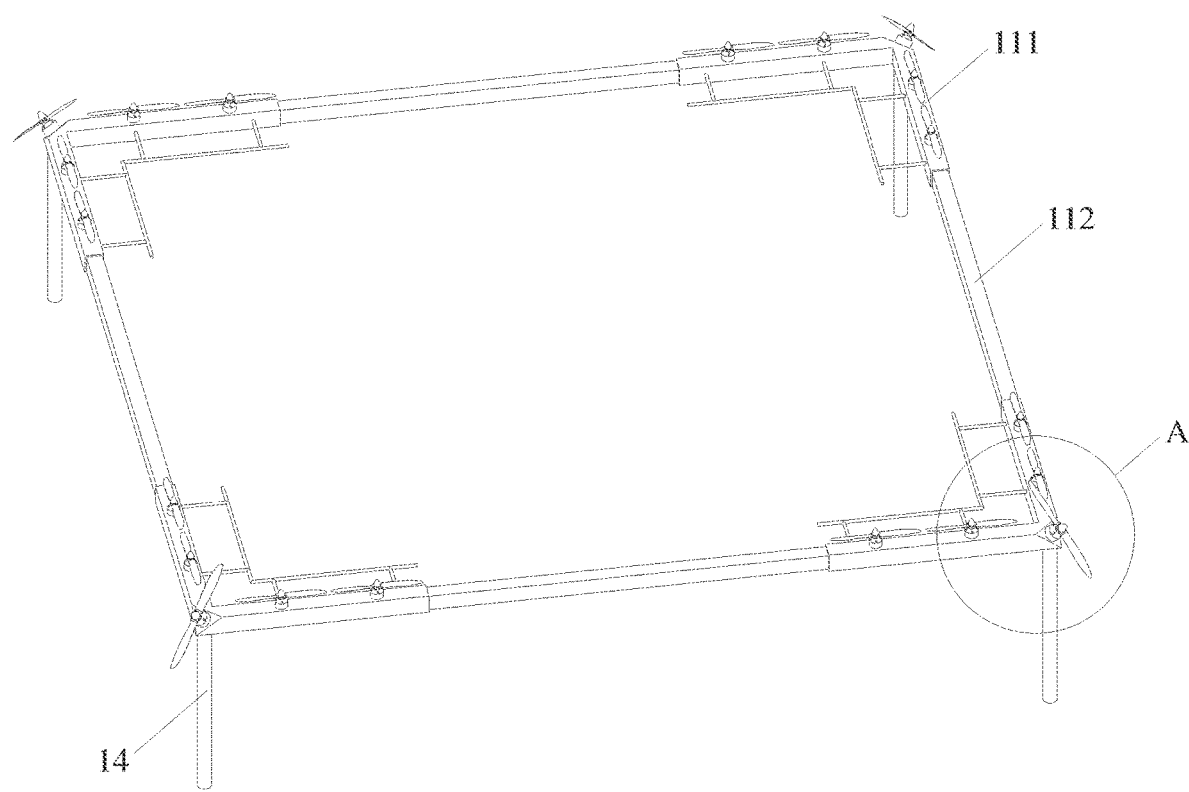
FIG. 2 is a schematic diagram of the multi-rotor aircraft in an expanded state according to Embodiment 1, 2 and 5 of the present disclosure.
Figure 3:
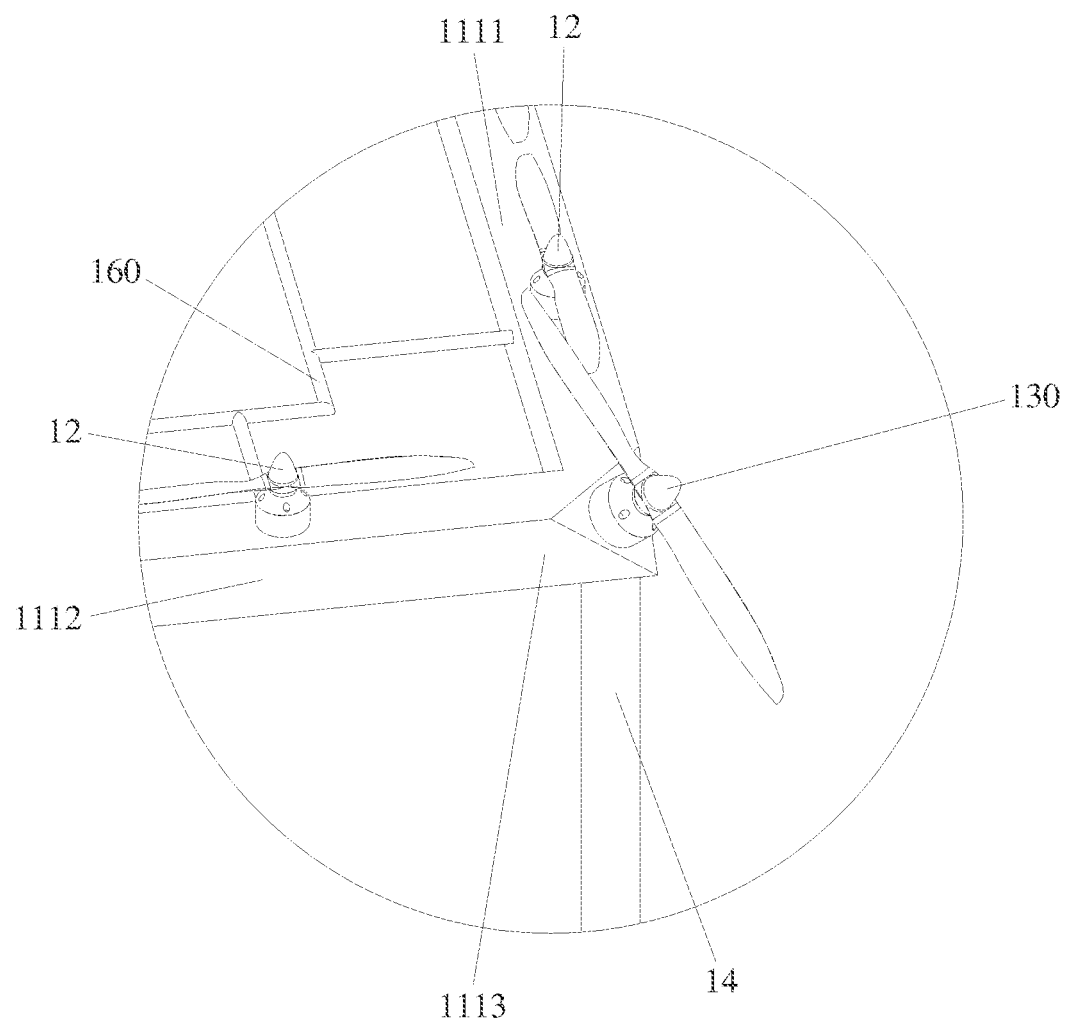
FIG. 3 is an expanded view of the part A in FIG. 2.

Referring to FIGS. 1-3, the multi-rotor aircraft 1 comprises a controller (not shown in the figure), an annular airframe 11, at least two first rotor units 12 and at least two actuation components 13. Wherein, the controller is a conventional flight controller in the art, which is arranged on the annular airframe 11. The annular airframe 11 comprises at least two frames 111 and at least two connecting units 112, adjacent frames 111 are movably connected by at least one connecting unit 112. At least two first rotor units 12 are arranged on the annular airframe 11, that is, the first rotor units 12 may be arranged on at least one of the frames 111 or on at least one of the connecting units 112. The first rotor units 12 are electrically connected with the controller, and are used to provide lift for the multi-rotor aircraft 1 to fly. At least two actuation components 13 are arranged on the annular airframe 11, and are electrically connected with the controller. When the multi-rotor aircraft 1 flies, the actuation components 13 are used for making the adjacent frames 111 move away from each other or move close to each other, so as to enlarge or reduce the enclosed area of the annular airframe 11 respectively.

It can be understood that the multi-rotor aircraft 1 further comprises a power component (not shown in the figure). The power component is arranged on the annular airframe 11 and is electrically connected with the controller. The power component is used for providing electric power to the controller, the first rotor units 12 and the actuation components 13, wherein the power component is a conventional battery module in the art.

Optionally, when the multi-rotor aircraft 1 flies forward, the thrust of the first rotor units 12 is further used to provide driving force for the multi-rotor aircraft 1 to fly forward.

Further, referring to FIG. 3, in the illustrated implementation, each actuation component 13 comprises a second rotor unit 130 and a resilient member (not shown in the figure). Wherein, the second rotor unit 130 is arranged on at least one of the frames 111 or on at least one of the connecting units 112, and is electrically connected with the controller. The second rotor unit 130 is used for providing driving force to make the adjacent frames 111 move away from each other, specifically, the thrust of the second rotor unit 130 is towards the outer side of the annular airframe 11 or is inclined towards the outer side of the annular airframe 11. Two opposite ends of the resilient member are respectively connected to two adjacent frames 111, or are respectively connected to one of the frames 111 and one of the connecting unit 112 connected with the frame 111. The resilient force of the resilient member is used for driving the adjacent frames 111 to move close to each other. In the case that the connecting unit 112 is extendable, the two opposite ends of the resilient member may be both arranged on one of the connecting units 112, which provides driving force to make the connecting unit 112 contract. Preferably, the resilient member is a spring; when the two adjacent frames 111 are closest, the spring is at its shortest length.

When the second rotor unit 130 starts and increases thrust, the adjacent frames 111 move away from each other, so that the distance between the adjacent frames 111 gradually increases, thereby significantly expanding the enclosed area of the annular airframe 11, accordingly, the spring is stretched until the frame 111 reaches the maximum mechanical displacement relative to the connecting unit 112, or until the thrust of the second rotor unit 130 and the resilient force of the spring are in equilibrium, then the second rotor unit 130 maintains a certain thrust output to keep the adjacent frames 111 away from each other, in this case, it can be understood that, the controller may adjust magnitude of the thrust of the second rotor unit 130 to keep the adjacent frames away at various distances, enabling the enclosed area of the annular airframe 11 to be adjusted as various sizes. When the second rotor unit 130 stops or decreases thrust, the adjacent frames 111 move close to each other under the action of the resilient force of the spring, so that the distance between the adjacent frames gradually decreases until the enclosed area of the annular airframe 11 returns to the minimum size, then the resilient force of the spring may be none-zero to keep the adjacent frames 111 in the closest state. In this way, when the multi-rotor aircraft 1 flies, the purpose of making the adjacent frames 111 move away from each other or close to each other can be achieved by means of the second rotor unit 130 and the resilient member.

The resultant thrust of the whole second rotor units 130 may be set to be zero, so as to prevent the resultant thrust from affecting motion control of the multi-rotor aircraft 1. Alternatively, the resultant thrust may be set to be non-zero, and may be used for driving the multi-rotor aircraft 1 to move in a direction same as the resultant thrust or in other specified direction. For example, the resultant thrust is in horizontal direction, while the lift provided by the first rotor units 12 and the gravity of the multi-rotor aircraft 1 are in equilibrium, so that the multi-rotor aircraft 1 can be driven to fly in horizontal direction, which helps to improve the maneuverability of the multi-rotor aircraft 1.

It should be noted that, the side at which the enclosed area of the annular airframe is disposed is the inner side of the annular airframe, the side, opposite to the enclosed area, of the annular airframe is the outer side of the annular airframe.

Further, referring to FIG. 2 and FIG. 3, in the illustrated implementation, each of the frames 111 includes a first frame body 1111, a second frame body 1112 and a connecting portion 1113, wherein the first frame body 1111 and the second frame body 1112 are connected by the connecting portion 1113. The first frame body 1111, the second frame body 1112 and the connecting portion 1113 may be connected to form U-shaped or L-shaped or V-shaped frame. The first frame body 1111 of the frame and the second frame body 1112 of an adjacent frame 111 are connected by the connecting unit 112, that is, the first frame body 1111 of one of two adjacent frames 111 is connected with the second frame body 1112 of the other one of those two frames 111 by one of the connecting units 112.

Optionally, the connection unit 112 may be a linear guide structure, that is, the connection unit 112 may be a linear guide rail, a guide rod, a guide sleeve or the like, at least one end of the connection unit 112 is inserted or sleeved with the first frame body 1111 of an adjacent frame 111, or is inserted or sleeved with the second frame body 1112 of an adjacent frame 111. Alternatively, the connecting unit 112 may be an extendable structure, which is connected to the first frame body 1111 of one of two adjacent frames 111 and to the second frame body 1112 of the other one of those two adjacent frames 111, for example, the connecting unit 112 may be a multi-bar linkage hinge extendable mechanism. Further, the connecting unit 112 may be a multi-section guide structure or a multi-section extendable structure, that is, the connecting unit 112 may be a multi-section linear slide rail, a multi-section telescopic sleeve or the like, enabling the adjacent frames 111 to move away from each other at a larger distance, thereby increasing the variation range of the enclosed area of the annular airframe 11.

Optionally, the frame 111 may slide with respect to the connecting unit 112 which is connected to the first frame body 1111 of this frame 111 and slide with respect to the connecting unit 112 which is connected to the second frame body 1112 of the same frame at the same time, alternatively, the connecting unit 112 which is connected to the first frame body 1111 of the frame 111 and the connecting unit 112 which is connected to the second frame body 1112 of the same frame 111 may extend/contract at the same time.

Further, referring to FIG. 2 and FIG. 3, in the illustrated implementation, the first frame body 1111 is provided with at least one of the first rotor units 111 arranged on the first frame body 1111, and the second frame body 1112 is provided with at least one of the first rotor units 111 arranged on the second frame body 1112; the connecting portion 1113 is provided with at least one of the second rotor units 130 arranged on the connecting portion 1113. The second rotor unit 130 can generate a non-zero component of the thrust along the length direction of the first frame body 1111 and generate another non-zero component of the thrust along the length direction of the second frame body 1112 at the same time, wherein the first frame body 1111 and the second frame body 1112 are part of the same frame 111 on which the second rotor unit 130 is disposed.

Optionally, the first frame body 1111 and the second frame body 1112 may be respectively sleeved on the connecting unit 112, one second rotor unit 130 generates a non-zero component of the thrust along the length direction of the first frame body 1111 of the frame 111 on which the second rotor unit 130 is disposed, while another second rotor unit 130 on the adjacent frame 111 generates a non-zero component of the thrust along the length direction of the second frame body 1112 of the frame 111 on which the second rotor unit 130 is disposed, the non-zero thrust components of those two second rotor units 130 are opposite in directions, so as to drive those two frames 111 to move away from each other. When the second rotor unit 130 on each frame 111 of the annular airframe 11 generates or increases the thrust at the same time, the adjacent frames 111 move away from each other, thereby enlarging the enclosed area of the annular airframe 11.

Figure 4:
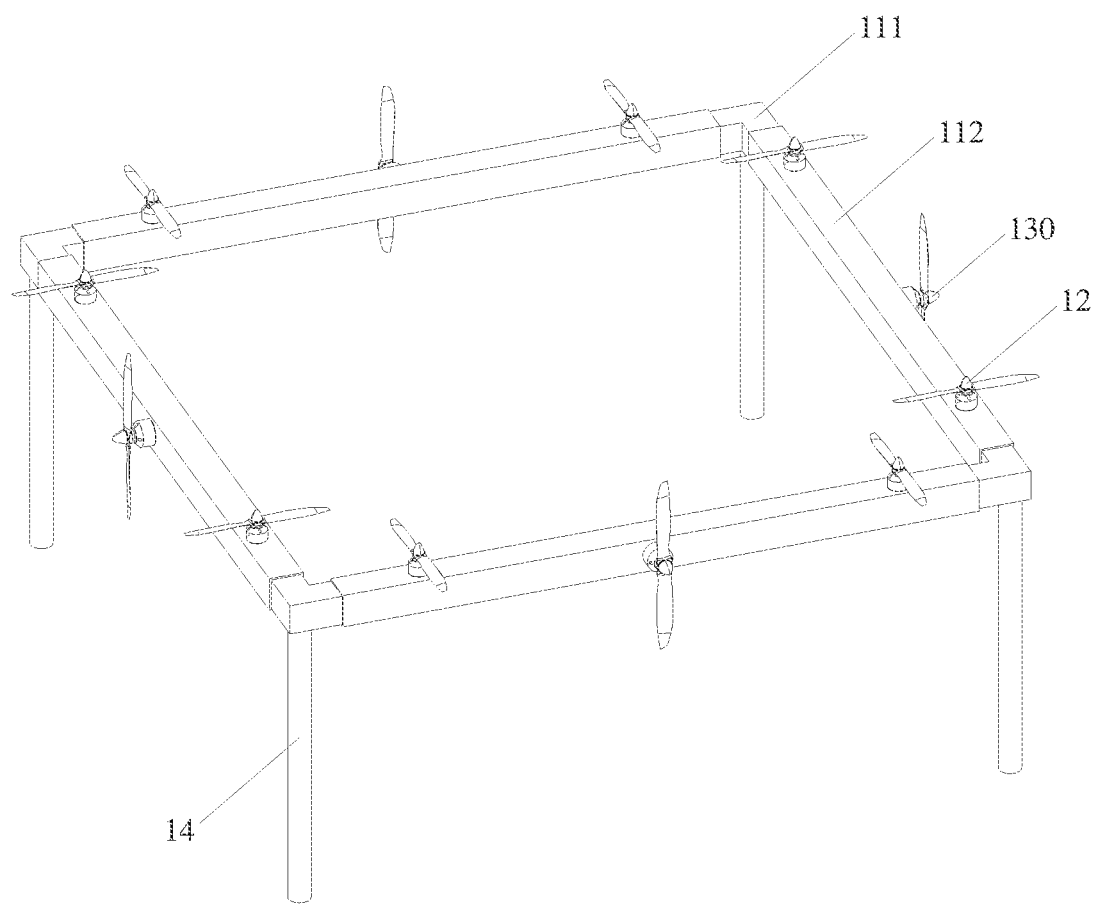
FIG. 4 is a schematic diagram of another multi-rotor aircraft in a shrinked state according to Embodiment 1 of the present disclosure, wherein the first rotor units and the second rotor units are both arranged on the connecting unit.
Figure 5:
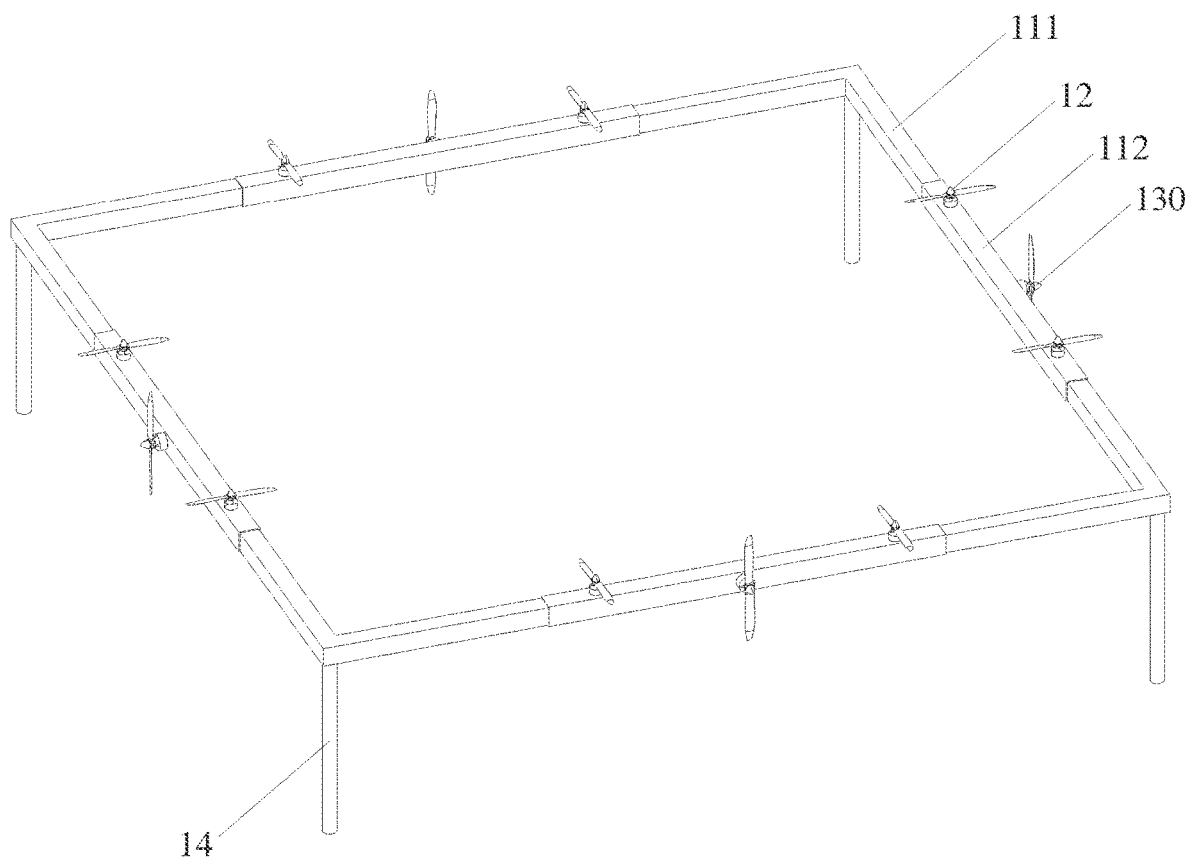
FIG. 5 is a schematic diagram of the multi-rotor aircraft in FIG. 4 in an expanded state.

In another implementation, referring to FIG. 4 and FIG. 5, at least one of the first frame body 1111 and the second frame body 1112 may be inserted into the connecting unit 112, in this case, at least one of the first rotor units 12 and at least one of the second rotor units 130 may be arranged on the connecting unit 112.

Further, referring to FIG. 3, the thrust of the second rotor unit 130 may have a non-zero component along the thrust direction of at least one of the first rotor units 12. After the second rotor unit 130 starts, this non-zero thrust component is used for increasing the lift of the multi-rotor aircraft 1 or increasing the driving force used for driving the multi-rotor aircraft 1 to fly forward.

Further, referring to FIG. 1 to FIG. 3, in the illustrated implementation, the annular airframe 11 further comprises at least two landing legs 14. The landing legs 14 may be respectively arranged on at least two frames 111 or at least two connecting units 112, which helps the multi-rotor aircraft 1 land on the ground smoothly.

In order to describe the working principle of the multi-rotor aircraft 1, a square annular airframe 11 is taken as an example. In this example, the annular airframe 11 comprises four L-shaped frames 111 and four connecting units 112, the corner portion of each L-shaped frame 111 is provide with one second rotor unit 130 arranged on the corner portion, each side portion of the L-shaped frame 111 is provided with one or more first rotor units 12 arranged on the respective side portion, one resilient member is arranged between two adjacent L-shaped frames 111 and is connected to those two L-shaped frames. After the multi-rotor aircraft 1 takes off, the controller controls the four second rotor units 130 to start and increase the thrust at the same time. Under the action of the thrust of the four second rotor units 130, the four L-shaped frames 111 move away from each other at the same time, thereby enlarging the enclosed area of the annular airframe 11. Before the multi-rotor aircraft 1 lands, the controller controls the four second rotor units 130 to gradually reduce thrust or to stop at the same time. Under the action of the resilient force of the resilient members, the four L-shaped frames 111 move close to each other at the same time, thereby reducing the enclosed area of the annular airframe 11.

Figure 6:
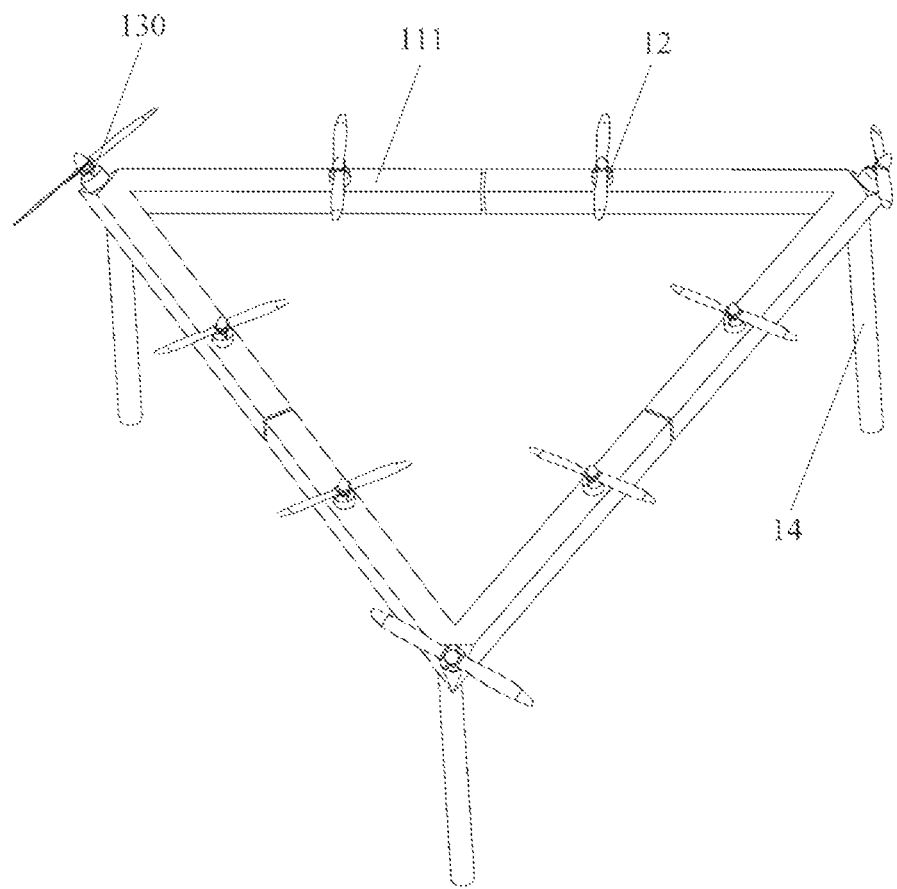
FIG. 6 is a schematic diagram of another more multi-rotor aircraft in a shrinked state according to Embodiment 1 of the present disclosure, wherein the annular airframe of the multi-rotor aircraft is triangular shaped.
Figure 7:
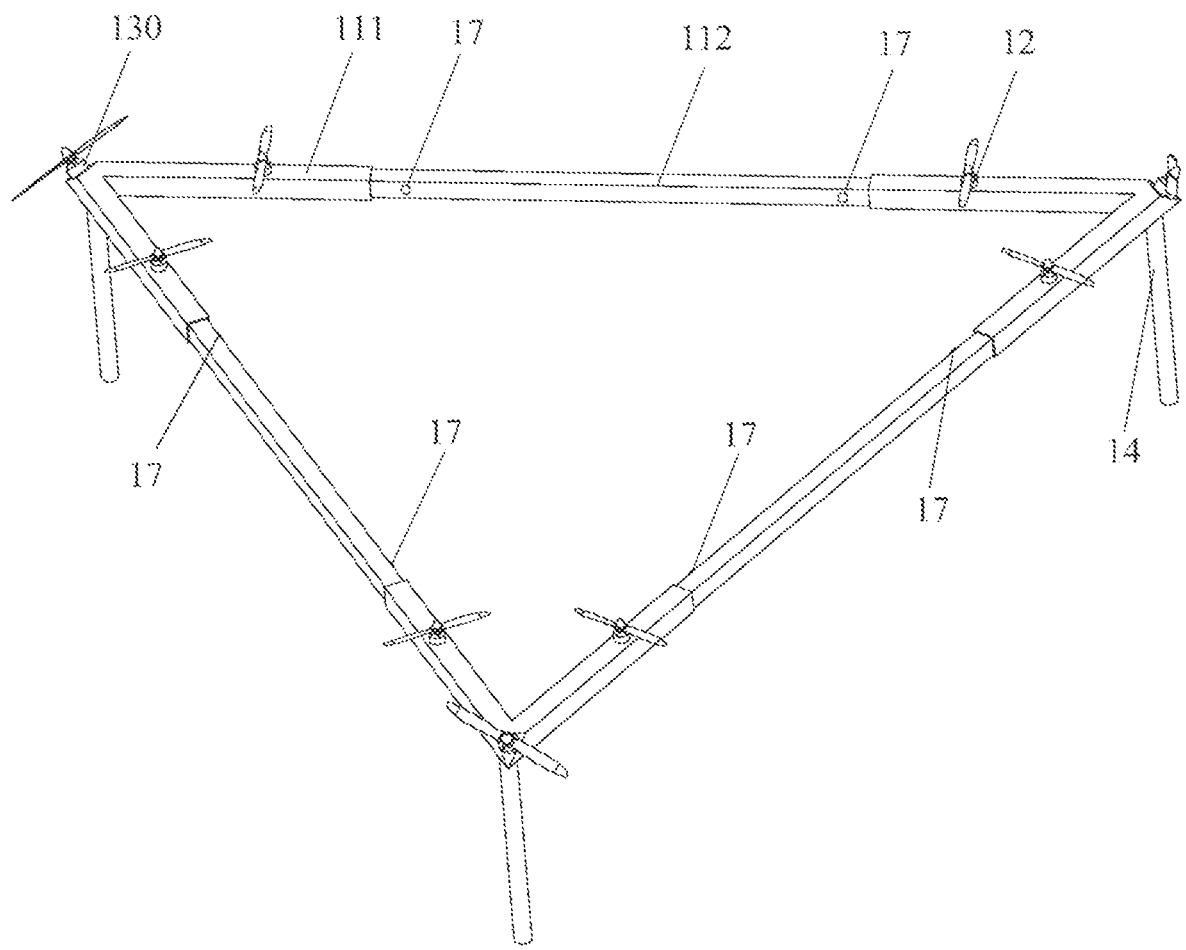
FIG. 7 is a schematic diagram of the multi-rotor aircraft in FIG. 6 in an expanded state.

It should be noted that, the annular airframe 11 is not limited to be square, for example, the annular airframe 11 may be triangular shaped (as shown in FIG. 6 and FIG. 7) or other shapes, which is not limited herein.

It should be noted that the resilient member may be omitted. In one implementation, each actuation component 13 comprises two types of second rotor units 130, one type of second rotor unit 130 is used for providing driving force to make the adjacent frames 111 move away from each other, and the other type of second rotor unit 130 is used for providing driving force to make the adjacent frames 111 move close to each other, specifically, the thrust of the other type of second rotor unit 130 is towards the inner side of the annular airframe 11 or is inclined towards the inner side of the annular airframe 11, so as to provide driving force to make the adjacent frames 111 move close to each other. When the enclosed area of the annular airframe 11 needs to be enlarged or to be reduced, one type of second rotor unit 130 starts or increases the thrust while the other type of second rotor unit 130 stops or reduces the thrust. For example, when the type of second rotor unit 130 which is used for providing driving force to make the adjacent frames 111 move close to each other starts or increases the thrust, and the other type of second rotor unit 130 stops or decreases the thrust, the enclosed area of the annular airframe 11 is reduced.

In another implementation, the second rotor unit 130 is used for providing driving force which makes the adjacent frames 111 move away from each other. In addition to providing the lift for the multi-rotor aircraft 1 to fly, the first rotor units 12 are further used to provide driving force to make the adjacent frames 111 move close to each other. Specifically, the thrust of each of the first rotor units 12 acting on the annular airframe 11 is inclined towards the inner side of the annular airframe 11, so that part of the thrust of the first rotor unit 12 is used for driving the adjacent frames 111 to move close to each other, meanwhile the first rotor unit 12 still maintains the non-zero vertical component of the thrust acting on the annular airframe 11, which serves as lift used for the multi-rotor aircraft 1 to fly.

The multi-rotor aircraft 1 is provided with an annular airframe 11, which comprises at least two frames 111 and at least two connecting units 112. The adjacent frames 111 are driven by the actuation component 13 to move away from each other or to move close to each other, so as to enlarge or reduce the enclosed area of the annular airframe 11 respectively. In this way, the multi-rotor aircraft 1 can actively change the overall size during flight. Specifically, at take-off stage and at landing stage, the multi-rotor aircraft reduces the enclosed area of the annular airframe 11, which respectively helps the multi-rotor aircraft take off and land in a limited area site. At other stage of the flight, the multi-rotor aircraft 1 may enlarge the enclosed area of the annular airframe 11 for some special applications such as catching a drone 2 intruding into the no-fly airspace, aerial displaying a large advertisement banner, inspecting the structure of a tower-shaped building, etc.

Specifically, in the case that the multi-rotor aircraft 1 is used for aerial displaying the large advertisement banner, the advertisement banner is arranged on the annular airframe 11, the multi-rotor aircraft 1 deploys the advertisement banner in the air by enlarging the enclosed area of the annular airframe 11 during flight. In the case that the multi-rotor aircraft 1 is used for inspecting the tower-shaped building such as a communication tower, a factory chimney tower and a blade of a wind turbine, the inner side of the annular airframe 11 is surrounded by sensors 17 (as shown in FIG. 7) such as cameras, the sensors 17 are arranged on the annular airframe 11 and are used for inspection. When performing the inspection, the multi-rotor aircraft 1 makes the tower-shaped building to penetrate the enclosed area of the annular airframe 11, so as to improve the inspection efficiency.

Embodiment 2

Referring to FIG. 1 to FIG. 3, the multi-rotor aircraft in this embodiment is basically the same as that in Embodiment 1. The difference is that, the actuation component 13 is a linear actuator, two opposite ends of the linear actuator are respectively connected to two adjacent frames 111, or are respectively connected to the frame 111 and the connecting unit 112 connected with the frame 111. In the case that the connecting unit 112 is extendable structure, the two opposite ends of the linear actuator may be both connected to the connecting unit 112. Specifically, the linear actuator is a conventional mechanism that can realize linear motion of the load. The linear actuator may convert the rotary motion of the motor into linear motion of the load by means of a lead screw or a belt transmission; alternatively, the linear actuator may be a pneumatic slide or a hydraulic cylinder, etc. That is, the fixed end of the linear actuator is connected to one of two adjacent frames 111, the movable end of the linear actuator is connected to the other one of those two adjacent frames 111; alternatively, the fixed end of the linear actuator is connected to one of the frame 111 and the connecting unit 112 connected with the frame 111, the movable end of the linear actuator is connected to the other one of the frame 111 and the connecting unit 112; alternatively, both the fixed end and the movable end of the linear actuator are connected to the connecting unit 112, so that the purpose of making the adjacent frames 111 move away from each other or close to each other can be achieved.

Embodiment 3

Figure 8:
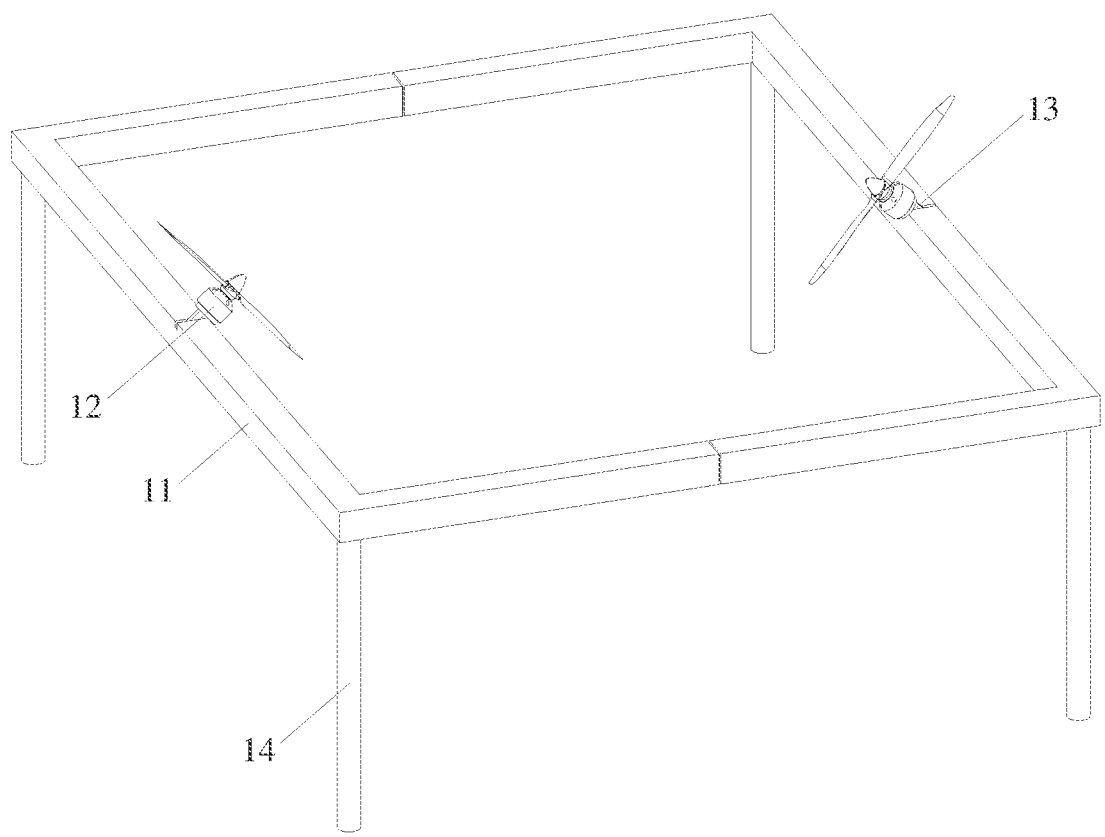
FIG. 8 is a schematic diagram of a multi-rotor aircraft in a shrinked state according to Embodiment 3 of the present disclosure.
Figure 9:
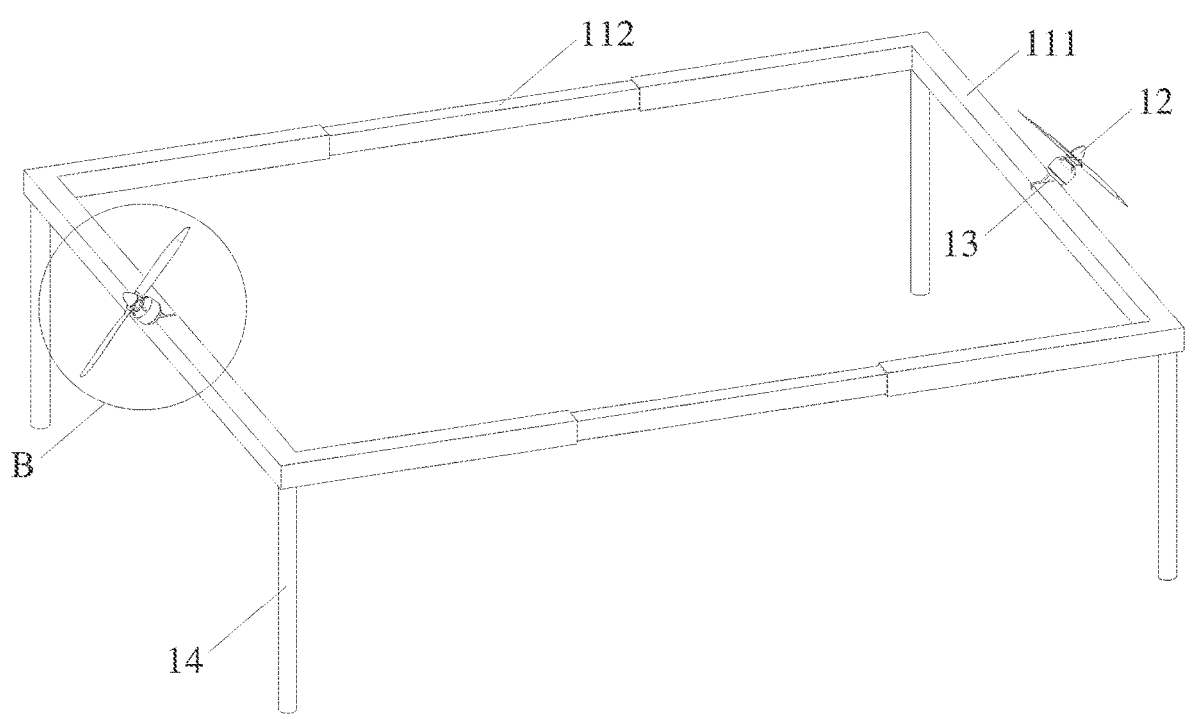
FIG. 9 is a schematic diagram of the multi-rotor aircraft in an expanded state according to Embodiment 3 of the present disclosure.
Figure 10:
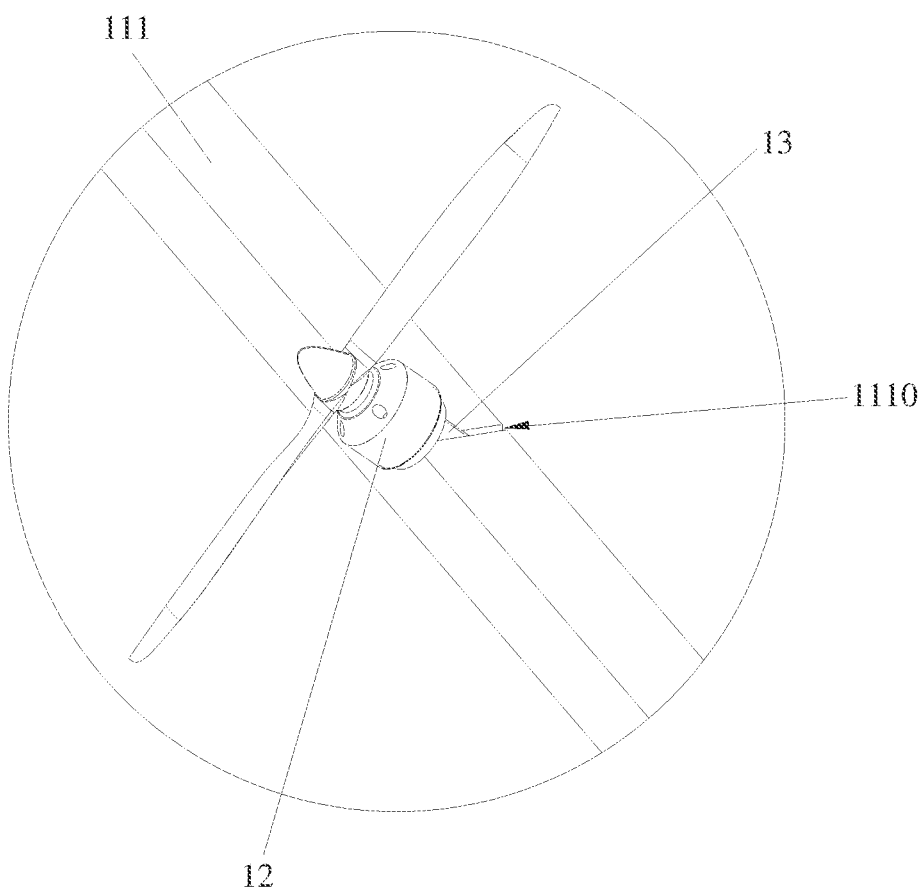
FIG. 10 is an expanded view of the part B in FIG. 2.

Referring to FIG. 8 to FIG. 10, the multi-rotor aircraft in this embodiment is basically the same as that in Embodiment 1. The difference is that, each of the actuation component 13 is connected with at least one of the first rotor units 12 in a transmission way, and the actuation component 13 is used for driving the first rotor unit 12 to change the direction of the thrust acting on the annular airframe 11, so as to make the adjacent frames 111 move away from each other or move close to each other during flight of the multi-rotor aircraft 1, thereby enlarging or reducing the enclosed area of the annular airframe 11 respectively.

Optionally, the actuation component 13 may comprise an actuation member and a transmission member, the actuation member is arranged on the frame 111, one end of the transmission member is connected to power output shaft of the actuation member, the other end of the transmission member is connected with the first rotor unit 12, the actuation member may drive the first rotor unit 12 to rotate about the power output shaft of the actuation member via the transmission member, so as to change the direction of the thrust of the first rotor unit 12 acting on the annular airframe 11.

Referring to FIG. 9, when the actuation component 13 drives the first rotor unit 12 to tilt the thrust acting on the annular airframe 11 towards the outer side of the annular airframe 11 at a certain angle, a portion of the thrust of the first rotor unit 12 is used for driving the adjacent frames 111 to move away from each other, meanwhile the first rotor unit 12 still maintains the non-zero vertical component of the thrust acting on the annular airframe 11, which serves as lift used for the multi-rotor aircraft 1 to fly.

Referring to FIG. 8, when the actuation component 13 drives the first rotor unit 12 to tilt the thrust acting on the annular airframe 11 towards the inner side of the annular airframe 11 at a certain angle, a portion of the thrust of the first rotor unit 12 is used for driving the adjacent frames 111 to move close to each other, meanwhile the first rotor unit 12 still maintains the non-zero vertical component of the thrust acting on the annular airframe 11, which serves as lift used for the multi-rotor aircraft 1 to fly.

In this way, the first rotor unit 12 can not only provide lift for the multi-rotor aircraft 1 to fly, but also provide driving force for the annular airframe 11 to enlarge/reduce the enclosed area.

It should be noted that, when the actuation member drives the first rotor unit 12 to rotate about the power output shaft of the actuation member, the controller is capable of controlling the first rotor unit 12 to dynamically change the magnitude of the thrust, making the lift of the multi-rotor aircraft 1 remain constant, which helps the multi-rotor aircraft 1 maintain the altitude.

In one implementation, the actuation member is arranged inside the frame 111, a guide slot 1110 may be opened on the frame 111, one end of the transmission member extends out from the guide slot 1110 and is connected with the first rotor unit 12, the guide slot 1110 can guide the transmission member to sway along the cross section of the frame 111, and prevent the transmission member from shaking along the length direction of the frame 111.

Further, the number of the first rotor unit 12 arranged on each frame 111 is not limited to one illustrated in the figure, for example, the multi-rotor aircraft comprises two frames 111, and the two frames 111 are each provided with two first rotor units 12 on each frame 111 to jointly form a quad-rotor aircraft, the actuation component 13 arranged on each frame 111 is used for driving the two first rotor units 12 on the same frame 111 to synchronously change direction of the thrust acting on the annular airframe 11.

Embodiment 4

Figure 11:
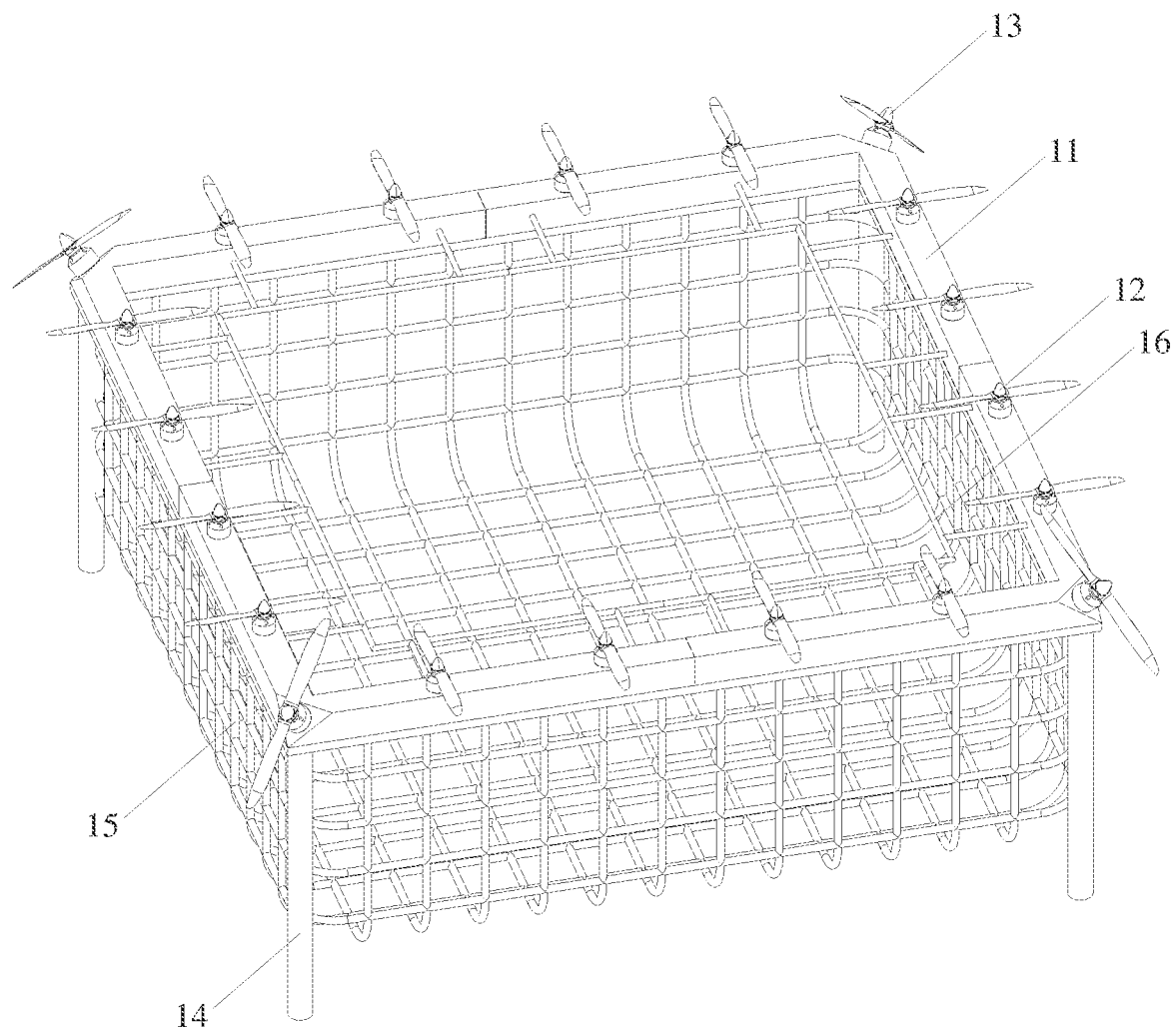
FIG. 11 is a schematic diagram of a multi-rotor aircraft in a shrinked state according to Embodiment 4 and 5 of the present disclosure.
Figure 12:
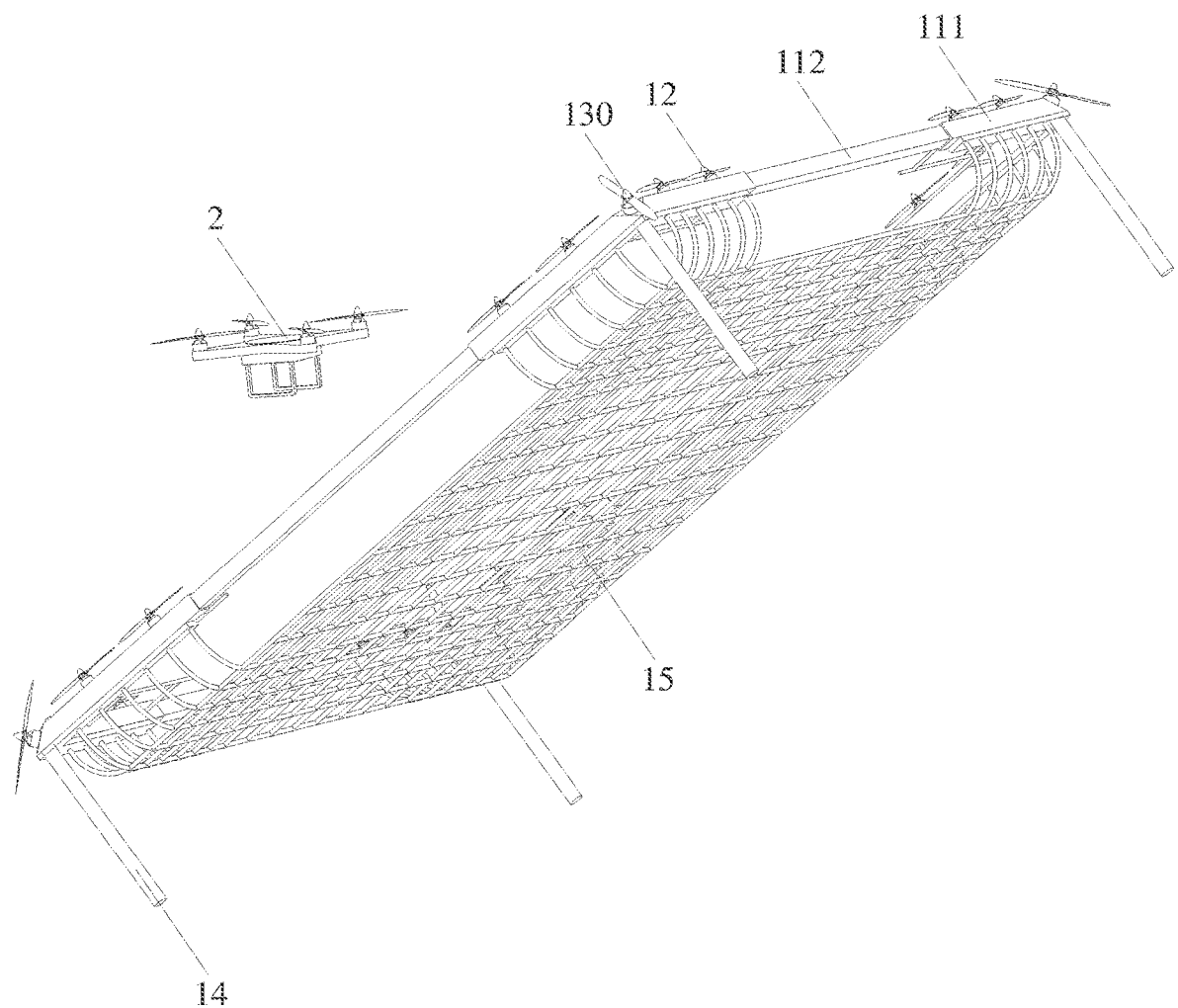
FIG. 12 is a schematic diagram that the multi-rotor aircraft in an expanded state according to Embodiment 4 and 5 is catching a drone.
Figure 13:
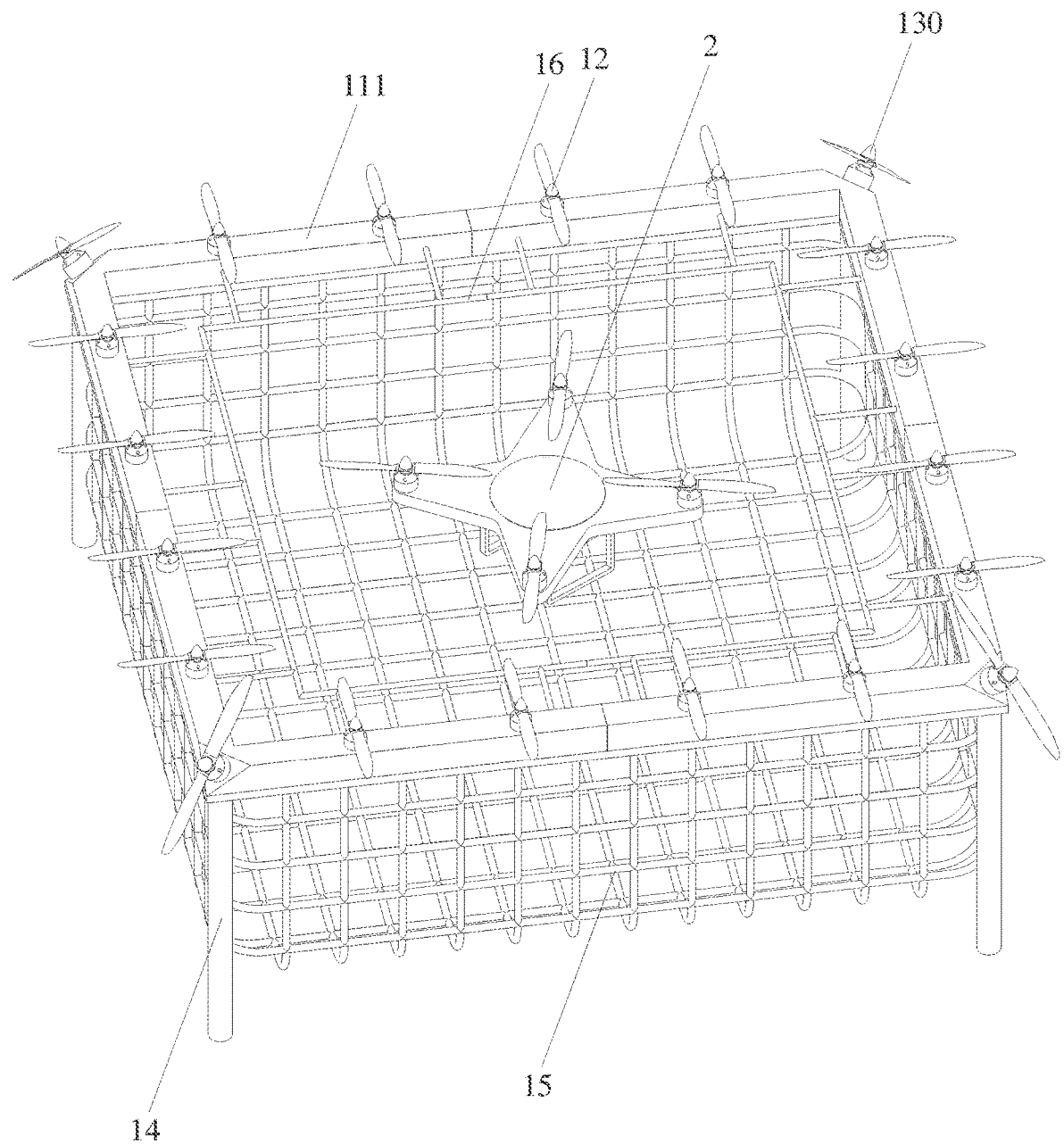
FIG. 13 is a schematic diagram that the multi-rotor aircraft according to Embodiment 4 and 5 has caught the drone.

Referring to FIG. 11 to FIG. 13, the multi-rotor aircraft in this embodiment is basically the same as that in any one of Embodiment 1 to 3. The difference is that, the multi-rotor aircraft 1 further comprises a net cage 15, the net cage 15 may be arranged on the frames 111 or on the connecting units 112 or on the landing legs 14. An opening of the net cage 15 can be scaled up or down along with the enclosed area of the annular airframe 11, that is, in the process that the enclosed area of the annular airframe 111 is enlarged or reduced, the annular airframe 111 respectively drives the opening of the net cage 15 to expand or to shrink at the same time. Optionally, the net cage 15 is detachably connected to the frame 111 or the connecting unit 112 or the landing leg 14, so that the net cage 15 may be mounted on the annular airframe 11 as needed.

Further, the multi-rotor aircraft 1 is used for catching the drone 2 intruding into no-fly airspace. Specifically, when the multi-rotor aircraft 1 needs to catch the drone 2, the multi-rotor aircraft 1 can expand the opening of the net cage 15 by enlarging the enclosed area of the annular airframe 11, thereby improving the success rate that the drone 2 enters the net cage 15, and meanwhile keeping the net cage 15 in a tensioned state, thus, when the multi-rotor aircraft 1 flies forward at high speed, a contact between the net cage 15 and the first rotor units 12 due to shaking of the net cage 15 which is caused by air flow can be avoided.

One of implementations that the multi-rotor aircraft 1 catches the drone 2 is as shown in FIG. 12, the multi-rotor aircraft 1 approaches the drone 2 from behind the drone 2, and tilts the annular airframe 11 in the flight direction, making the drone 2 finally caught into the net cage 15, which not only enables the first rotor units 12 and/or the second rotor units 130 to provide driving force for the multi-rotor aircraft 1 to fly forward, so as to accelerate the multi-rotor aircraft 1, but also orientates the opening of the net cage 15 towards the drone 2, so as to make the drone 2 caught into the net cage 15 once the multi-rotor aircraft 1 catches up with the drone 2. After the drone 2 enters the net cage 15, the multi-rotor aircraft 1 can shrink the opening of the net cage 15 by reducing the enclosed area of the annular airframe 11, thereby lowering the risk that the caught drone 2 escapes out of the net cage 15 via the opening, and meanwhile making the net cage 15 slack to trap the caught drone 2.

Embodiment 5

Referring to FIG. 1, FIG. 2, FIG. 3, FIG. 11, FIG. 12 and FIG. 13, the multi-rotor aircraft in this embodiment is basically the same as that in Embodiment 4. The difference is that, a protective structure 16 is arranged on at least one of the frames 111; alternatively, a protective structure 16 is arranged on at least one of the connecting units 112. The protective structure 16 extends to the inner side of the annular airframe 11, and the protective structure 16 is used for blocking the net cage 15 from contacting propellers of the first rotor units 12. Specifically, the protective structure 16 is composed of a plurality of protective barriers 160. The plurality of the protective barriers are respectively arranged on the frames 111 or the connecting units 112, and are disposed between the propeller of the first rotor unit 12 and the net cage 15.

When the enclosed area of the annular airframe 11 is enlarged, the plurality of protective barriers 160 move away from each other, which avoids blocking the opening of the net cage 15 and allows the drone 2 to enter the net cage 15. When the enclosed area of the annular airframe 11 is reduced, the plurality of protective barriers 160 move close to each other, which can partially or completely close the opening of the net cage 15, so as to prevent the caught drone 2 from escaping out of the net cage 15 via the opening of the net cage 15.

Embodiment 6

The multi-rotor aircraft in this embodiment is basically the same as that in Embodiment 1. The difference is that, the resilient member is replaced with a vectoring mechanism. The vectoring mechanism is electrically connected with the controller, and is connected with the second rotor unit 130 in a transmission way. The vectoring mechanism is used for driving the second rotor unit 130 to change the direction of the thrust acting on the annular airframe 11, so that, in addition to being used for driving the adjacent frames 111 to move far away from each other, the second rotor unit 130 is further used for driving the adjacent frames 111 to move close to each other.

The method that the vectoring mechanism drives the second rotor unit 130 to change the direction of the thrust acting on the annular airframe 11 is substantially the same as the method that the actuation component 13 drives the first rotor unit 12 to change the direction of the thrust acting on the annular airframe 11 in Embodiment 3. However, in this embodiment, the second rotor unit 130 may only provide driving force for driving the adjacent frames 111 to move away from each other and to move close to each other, but does not provide lift for the multi-rotor aircraft 1 to fly. That is, when the thrust of the second rotor unit 130 acting on the annular airframe 11 is towards the outer side of the annular airframe 11 and is perpendicular to the direction of the thrust of the first rotor unit 12, the second rotor unit 130 is only used for driving the adjacent frames 111 to move away from each other; when the thrust of the second rotor unit 130 acting on the annular airframe 11 is towards the inner side of the annular airframe 11 and is perpendicular to the direction of the thrust of the first rotor unit 12, the second rotor unit 130 is only used for driving the adjacent frames 111 to move close to each other.

The technical features of the above-mentioned embodiments can be combined. In order to simplify the description, not all possible combinations of the technical features of the above-mentioned embodiments have been provided. It can be appreciated that, as long as no contradiction is concluded from these combinations, all reasonable combinations of the features should be considered as the scope recorded in the description.

The present disclosure mainly presents several embodiments with their descriptions more specific and detailed than others, but they should not be construed as limiting the scope of the present disclosure. It should be noted that for persons skilled in the art, several modifications and improvements can be made without departing from the conception of the present disclosure, which shall all fall within the scope of the present disclosure. Therefore, the scope of the present disclosure shall be subject to the appended claims.

The invention claimed is:

1. A multi-rotor aircraft comprising:
    a controller;
    an annular airframe, wherein the annular airframe comprises at least two frames and at least two connecting units, adjacent frames are movably connected by at least one of the connecting units;
    at least two first rotor units, wherein the first rotor units are arranged on the annular airframe and are electrically connected with the controller, the first rotor units are used to provide lift for the multi-rotor aircraft to fly;
    at least two actuation components, wherein the actuation components are arranged on the annular airframe and are electrically connected with the controller; when the multi-rotor aircraft flies, the actuation components are used for making the adjacent frames move away from each other or move close to each other, so as to enlarge or reduce the enclosed area of the annular airframe respectively;
    each of the actuation components comprises a second rotor unit, the second rotor unit is arranged on at least one of the frames or on at least one of the connecting units, and is electrically connected with the controller;
    the second rotor unit is used for providing driving force to make the adjacent frames move away from each other, the actuation component further comprises a resilient member, the resilient force of the resilient member is used for driving the adjacent frames to move close to each other; alternatively, second rotor units are provided with two types, a first type of second rotor unit is used for providing driving force to make the adjacent frames move away from each other, and a second type of second rotor unit is used for providing driving force to make the adjacent frames move close to each other; alternatively, the second rotor unit is used for providing driving force to make the adjacent frames move away from each other, the first rotor units are further used for providing driving force to make the adjacent frames move close to each other.

2. The multi-rotor aircraft of claim 1, wherein each of the frames comprises a first frame body, a second frame body and a connecting portion, the first frame body and the second frame body of the same frame are connected by the connecting portion; the first frame body of one of two adjacent frames and the second frame body of the other of those two adjacent frames are connected by one of the connecting units;

the first frame body is provided with at least one of the first rotor units arranged on the first frame body, and the second frame body is also provided with the at least one of first rotor units arranged on the second frame body; the connecting portion is provided with the at least one of second rotor units arranged on the connecting portion; the second rotor unit is used for generating a non-zero component of the thrust along the length direction of the first frame body of the frame on which the second rotor unit is disposed and generating another non-zero component of the thrust along the length direction of the second frame body of the same frame at the same time; alternatively, the connecting portion is provided with at least one of the first rotor units and at least one of the second rotor units both arranged on the connecting unit.

3. The multi-rotor aircraft of claim 1, wherein the resultant thrust of the whole second rotor units is always zero, so as to prevent the resultant thrust from affecting motion control of the multi-rotor aircraft; alternatively, the resultant thrust of the whole second rotor units is non-zero, and is used for driving the multi-rotor aircraft to move in a direction same as the resultant thrust or in other specified direction; and/or the thrust of the second rotor unit has a non-zero component along the thrust direction of at least one of the first rotor units; after the second rotor units starts, this non-zero thrust component is configured to increase lift of the multi-rotor aircraft or to increase driving force used for driving the multi-rotor aircraft to fly forward; and/or the thrust of the second rotor unit is towards the outer side of the annular airframe or is inclined towards the outer side of the annular airframe; alternatively, the thrust of the first type of the second rotor unit is towards the outer side of the annular airframe or is inclined towards the outer side of the annular airframe, the thrust of the second type of the second rotor unit is towards the inner side of the annular airframe or is inclined towards the inner side of the annular airframe;

and/or the controller is configured to adjust magnitude of the thrust of the second rotor unit to keep the adjacent frames away at various distances, enabling the enclosed area of the annular airframe to be adjusted as various sizes.

4. The multi-rotor aircraft of claim 2, wherein one second rotor unit is configured to generate a non-zero component of the thrust along the length direction of the first frame body of the frame on which the second rotor unit is disposed, while another second rotor unit on the adjacent frame is configured to generate a non-zero component of the thrust along the length direction of the second frame body of the frame on which the second rotor unit is disposed, the non-zero thrust components of those two second rotor units are opposite in directions, so as to drive those two frames to move away from each other; and/or the annular airframe comprises four L-shaped frames and four connecting units to form square shaped annular airframe, the corner portion of each L-shaped frame is provide with one second rotor unit arranged on the corner portion; after the multi-rotor aircraft takes off, the controller is configured to control the four second rotor units to start and increase the thrust at the same time;

under the action of the thrust of the four second rotor units, the four L-shaped frames are configured to move away from each other at the same time, thereby enlarging the enclosed area of the annular airframe; alternatively, the annular airframe comprises three V-shaped frames and three connecting units to form triangular shaped annular airframe.

5. The multi-rotor aircraft of claim 1, wherein at take-off stage and at landing stage, the multi-rotor aircraft is configured to reduces the enclosed area of the annular airframe, which respectively helps the multi-rotor aircraft take off and land in a limited area site; and/or a side at which the enclosed area of the annular airframe is disposed is the inner side of the annular airframe; a side, opposite to the enclosed area, of the annular airframe is the outer side of the annular airframe.

6. The multi-rotor aircraft of claim 1, wherein two opposite ends of the resilient member are respectively connected to two adjacent frames, or are respectively connected to one of the frames and one of the connecting units connected with the frame, or are both arranged on one of the connecting units; or wherein when the enclosed area of the annular airframe needs to be enlarged or to be reduced, one type of second rotor unit is configured to start or increase the thrust while the other type of second rotor unit is configured to stop or reduce the thrust; or wherein the thrust of each of the first rotor units acting on the annular airframe is inclined towards the inner side of the annular airframe, so as to provide driving force to make the adjacent frames move close to each other.

7. A multi-rotor aircraft comprising:

a controller;

an annular airframe, wherein the annular airframe comprises at least two frames and at least two connecting units, adjacent frames are movably connected by at least one of the connecting units;

at least two first rotor units, wherein the first rotor units are arranged on the annular airframe and are electrically connected with the controller, the first rotor units are used to provide lift for the multi-rotor aircraft to fly;

at least two actuation components, wherein the actuation components are arranged on the annular airframe and are electrically connected with the controller; when the multi-rotor aircraft flies, the actuation components are used for making the adjacent frames move away from each other or move close to each other, so as to enlarge or reduce the enclosed area of the annular airframe respectively;

wherein each of the actuation components is connected with at least one of the first rotor units in a transmission way; when the multi-rotor aircraft flies, the actuation component is used for driving the first rotor unit to change the direction of the thrust acting on the annular airframe, so as to make the adjacent frames move away from each other or move close to each other, thereby enlarging or reducing the enclosed area of the annular airframe respectively; or wherein each of the actuation components is connected with at least one of the first rotor units in a transmission way; when the multi-rotor aircraft flies, the actuation component is used for driving the first rotor unit to change the direction of the thrust acting on the annular airframe, so as to make the adjacent frames move away from each other or move close to each other, thereby enlarging or reducing the enclosed area of the annular airframe respectively; or wherein each of the actuation components comprises a second rotor unit and a vectoring mechanism, the second rotor unit is arranged on at least one of the frames or on at least one of the connecting units; the vectoring mechanism is electrically connected with the controller, and is connected with the second rotor unit in a transmission way; when the multi-rotor aircraft flies, the vectoring mechanism is used for driving the second rotor unit to change the direction of the thrust acting on the annular airframe, so as to make the adjacent frames move away from each other or move close to each other, thereby enlarging or reducing the enclosed area of the annular airframe respectively.

8. The multi-rotor aircraft of claim 7, wherein, when the actuation component drives the first rotor unit to tilt the thrust acting on the annular airframe towards the outer side of the annular airframe, a portion of the thrust of the first rotor unit is used for driving the adjacent frames to move away from each other, meanwhile the first rotor unit still maintains a non-zero vertical component of the thrust acting on the annular airframe, which serves as lift used for the multi-rotor aircraft to fly; and wherein,
when the actuation component drives the first rotor unit to tilt the thrust acting on the annular airframe towards the inner side of the annular airframe, a portion of the thrust of the first rotor unit is used for driving the adjacent frames to move close to each other, meanwhile the first rotor unit still maintains a non-zero vertical component of the thrust acting on the annular airframe, which serves as lift used for the multi-rotor aircraft to fly.

9. The multi-rotor aircraft of claim 7, wherein, when the thrust of the second rotor unit acting on the annular airframe is towards the outer side of the annular airframe, the second rotor unit is used for driving the adjacent frames to move away from each other; and wherein,
when the thrust of the second rotor unit acting on the annular airframe is towards the inner side of the annular airframe, the second rotor unit is used for driving the adjacent frames to move close to each other.

10. The multi-rotor aircraft of claim 7, wherein the resultant thrust of the whole second rotor units is always zero, so as to prevent the resultant thrust from affecting motion control of the multi-rotor aircraft; alternatively, the resultant thrust of the whole second rotor units is non-zero, and is used for driving the multi-rotor aircraft to move in a direction same as the resultant thrust or in other specified direction.

11. The multi-rotor aircraft of claim 7, wherein at take-off stage and at landing stage, the multi-rotor aircraft is configured to reduce the enclosed area of the annular airframe, which respectively helps the multi-rotor aircraft take off and land in a limited area site; and/or
a side at which the enclosed area of the annular airframe is disposed is the inner side of the annular airframe; a side, opposite to the enclosed area, of the annular airframe is the outer side of the annular airframe.

12. The multi-rotor aircraft of claim 7, wherein the actuation component comprises an actuation member and a transmission member, one end of the transmission member is connected to power output shaft of the actuation member, the other end of the transmission member is connected with the first rotor unit, the actuation member is arranged inside the frame, a guide slot is opened on the frame, the end of the transmission member which is connected with the first rotor unit extends out from the guide slot, the guide slot is configured to guide the transmission member to sway along the cross section of the frame, and to prevent the transmission member from shaking along the length direction of the frame; and/or
the multi-rotor aircraft comprises two frames, each of the frames is provided with two first rotor units on the frame, the actuation component arranged on each frame is configured to drive the two first rotor units on the same frame to synchronously change direction of the thrust acting on the annular airframe.

13. The multi-rotor aircraft of claim 7, wherein the second rotor unit is configured to merely drive the adjacent frames to move away from each other, and to not provide lift for the multi-rotor aircraft.

14. A multi-rotor aircraft comprising:
a controller;
an annular airframe, wherein the annular airframe comprises at least two frames and at least two connecting units, adjacent frames are movably connected by at least one of the connecting units;
at least two first rotor units, wherein the first rotor units are arranged on the annular airframe and are electrically connected with the controller, the first rotor units are used to provide lift for the multi-rotor aircraft to fly;
at least two actuation components, wherein the actuation components are arranged on the annular airframe and are electrically connected with the controller; when the multi-rotor aircraft flies, the actuation components are used for making the adjacent frames move away from each other or move close to each other, so as to enlarge or reduce the enclosed area of the annular airframe respectively;
wherein the multi-rotor aircraft further comprises a net cage;
the net cage is arranged on the annular airframe;
an opening of the net cage is configured to be scaled up or down along with the enclosed area of the annular airframe; or
wherein the multi-rotor aircraft further comprises an advertisement banner arranged on the annular airframe; when flying, the multi-rotor aircraft is configured to deploy the advertisement banner in the air by enlarging the enclosed area of the annular airframe, so as to aerial display the advertisement banner; or
wherein the multi-rotor aircraft further comprises sensors which are arranged on the annular airframe and are used for inspection of a tower-shaped building, the inner side of the annular airframe is surrounded by the sensors; when performing the inspection, the multi-rotor aircraft is configured to make the tower-shaped building to penetrate the enclosed area of the annular airframe.

15. The multi-rotor aircraft of claim 14, wherein the multi-rotor aircraft further comprises a protective structure arranged on at least one of the frames or on at least one of the connecting units;
the protective structure extends to the inner side of the annular airframe, and the protective structure is configured to block the net cage from contacting propellers of the first rotor units, the protective structure is composed of a plurality of protective barriers;
when the enclosed area of the annular airframe is reduced, the plurality of protective barriers are configured to move close to each other, so as to partially or completely close the opening of the net cage.

16. The multi-rotor aircraft of claim 14, wherein the multi-rotor aircraft is configured to expand the opening of the net cage by enlarging the enclosed area of the annular airframe when the multi-rotor aircraft needs to catch a drone; after the drone enters the net cage, the multi-rotor aircraft is configured to shrink the opening of the net cage by reducing the enclosed area of the annular airframe; and/or
in process that the enclosed area of the annular airframe is enlarged or reduced, the annular airframe is configured to respectively drives the opening of the net cage to expand or to shrink at the same time; and/or
the net cage is arranged on the frames or on the connecting units; alternatively, the annular airframe further comprises at least two landing legs, which are respectively arranged on at least two frames or at least two connecting units, the net cage is arranged on the landing legs.

17. The multi-rotor aircraft of claim 14, wherein at take-off stage and at landing stage, the multi-rotor aircraft is configured to reduce the enclosed area of the annular airframe, which respectively helps the multi-rotor aircraft take off and land in a limited area site; and/or
a side at which the enclosed area of the annular airframe is disposed is the inner side of the annular airframe; a side, opposite to the enclosed area, of the annular airframe is the outer side of the annular airframe.

18. The multi-rotor aircraft of claim 16, wherein the multi-rotor aircraft is configured to expand the opening of the net cage to keep the net cage in a tensioned state; the multi-rotor aircraft is also configured to shrink the opening of the net cage to make the net cage slack, so as to trap the drone which is caught; and/or
the multi-rotor aircraft further comprises a protective structure arranged on at least one of the frames or on at least one of the connecting units; the protective structure extends to the inner side of the annular airframe, and the protective structure is configured to block the net cage from contacting propellers of the first rotor units; the protective structure is composed of a plurality of protective barriers which are disposed between the propellers of the first rotor units and the net cage; when the enclosed area of the annular airframe is enlarged, the plurality of protective barriers are configured to move away from each other, which avoids blocking the opening of the net cage and allows the drone to enter the net cage.

19. A drone capture method, comprising:
providing a multi-rotor aircraft, wherein the multi-rotor aircraft comprises a controller, an annular airframe, at least two first rotor units, at least two actuation components and a net cage; the annular airframe comprises at least two frames and at least two connecting units, adjacent frames are movably connected by at least one of the connecting units; the first rotor units are arranged on the annular airframe and are electrically connected with the controller, the first rotor units are used to provide lift for the multi-rotor aircraft to fly; the actuation components are arranged on the annular airframe and are electrically connected with the controller; when the multi-rotor aircraft flies, the actuation components are used for making the adjacent frames move away from each other or move close to each other, so as to enlarge or reduce the enclosed area of the annular airframe respectively; the net cage is arranged on the; an opening of the net cage is configured to scaled up or down along with the enclosed area of the annular airframe;
when the multi-rotor aircraft needs to catch a drone, the multi-rotor aircraft expands the opening of the net cage by enlarging the enclosed area of the annular airframe;
after the drone enters the net cage, the multi-rotor aircraft shrinks the opening of the net cage by reducing the enclosed area of the annular airframe, so as to lower risk that the drone which is caught escapes out of the net cage via the opening of the net cage.

20. The drone capture method of claim 19, wherein the multi-rotor aircraft approaches the drone from behind the drone, and tilts the annular airframe in flight direction, which orients the opening of the net cage towards the drone, so as to make the drone finally caught into the net cage once the multi-rotor aircraft catches up with the drone, and/or, which enables the first rotor units to provide driving force for the multi-rotor aircraft to fly forward, so as to accelerate the multi-rotor aircraft.

* * * * *